United States Patent
Wang et al.

(10) Patent No.: US 11,030,525 B2
(45) Date of Patent: Jun. 8, 2021

(54) SYSTEMS AND METHODS FOR DEEP LOCALIZATION AND SEGMENTATION WITH A 3D SEMANTIC MAP

(71) Applicants: Baidu USA, LLC, Sunnyvale, CA (US); Baidu.com Times Technology (Beijing) Co., Ltd., Beijing (CN)

(72) Inventors: Peng Wang, Sunnyvale, CA (US); Ruigang Yang, Beijing (CN); Binbin Cao, Beijing (CN); Wei Xu, Saratoga, CA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 53 days.

(21) Appl. No.: 16/604,548

(22) PCT Filed: Feb. 9, 2018

(86) PCT No.: PCT/CN2018/075994
§ 371 (c)(1),
(2) Date: Oct. 10, 2019

(87) PCT Pub. No.: WO2019/153245
PCT Pub. Date: Aug. 15, 2019

(65) Prior Publication Data
US 2020/0364554 A1 Nov. 19, 2020

(51) Int. Cl.
*G06N 3/08* (2006.01)
*G06T 7/73* (2017.01)
(Continued)

(52) U.S. Cl.
CPC ............. *G06N 3/08* (2013.01); *G06K 9/6256* (2013.01); *G06K 9/6289* (2013.01);
(Continued)

(58) Field of Classification Search
CPC ........ G06N 3/08; G06N 3/0454; G06N 3/084; G06N 3/04; G06N 3/0445; G06N 3/0472;
(Continued)

(56) References Cited

U.S. PATENT DOCUMENTS

| 10,297,070 B1 * | 5/2019 | Zhu ..................... G06T 17/00 |
| 2015/0363933 A1 * | 12/2015 | Jung ..................... G06T 7/74 |
| | | 382/103 |

(Continued)

FOREIGN PATENT DOCUMENTS

| CN | 106470337 A | 3/2017 |
| CN | 107063258 A | 8/2017 |

(Continued)

OTHER PUBLICATIONS

"Hierarchical Scene Parsing by Weakly Supervised Learning with Image Descriptions"; Zhang Ruimao, IEEE Transactions on Pattern Analysis and Machine Intelligence (vol. 41, Issue: 3, pp. 596-610) (Year: 2018).*

(Continued)

*Primary Examiner* — Michael S Osinski
(74) *Attorney, Agent, or Firm* — North Weber & Baugh LLP

(57) ABSTRACT

Presented are deep learning-based systems and methods for fusing sensor data, such as camera images, motion sensors (GPS/IMU), and a 3D semantic map to achieve robustness, real-time performance, and accuracy of camera localization and scene parsing useful for applications such as robotic navigation and augment reality. In embodiments, a unified framework accomplishes this by jointly using camera poses and scene semantics in training and testing. To evaluate the presented methods and systems, embodiments use a novel dataset that is created from real scenes and comprises dense 3D semantically labeled point clouds, ground truth camera (Continued)

poses obtained from high-accuracy motion sensors, and pixel-level semantic labels of video camera images. As demonstrated by experimental results, the presented systems and methods are mutually beneficial for both camera poses and scene semantics.

20 Claims, 7 Drawing Sheets

(51) Int. Cl.
  *G06K 9/62*       (2006.01)
  *G06N 3/04*       (2006.01)
  *G06T 7/20*       (2017.01)

(52) U.S. Cl.
  CPC ............. *G06N 3/0454* (2013.01); *G06T 7/20* (2013.01); *G06T 7/74* (2017.01); *G06T 2207/20081* (2013.01); *G06T 2207/20084* (2013.01); *G06T 2207/30244* (2013.01)

(58) Field of Classification Search
  CPC .......... G06N 3/088; G06N 20/00; G06T 7/73; G06T 7/74; G06T 7/20; G06T 7/10; G06T 7/11; G06T 7/593; G06T 2207/20081; G06T 2207/20084; G06T 2207/30244; G06T 2207/10028; G06T 2207/10016; G06T 2207/30252; G06K 9/6256; G06K 9/6289; G06K 9/6267; G06K 9/00798; G06K 9/4628; G06K 9/627; G06K 9/6271; G06K 9/628; G06K 9/66; G06K 9/00201; G06K 9/46; G06K 9/4671
  See application file for complete search history.

(56) References Cited

U.S. PATENT DOCUMENTS

| | | | |
|---|---|---|---|
| 2016/0267359 A1* | 9/2016 | Gan | G06K 9/6228 |
| 2017/0054903 A1 | 2/2017 | Mate et al. | |
| 2017/0061249 A1* | 3/2017 | Estrada | G06T 5/005 |
| 2017/0061625 A1* | 3/2017 | Estrada | G06N 3/0454 |
| 2017/0076438 A1* | 3/2017 | Kottenstette | G06K 9/627 |
| 2017/0118539 A1* | 4/2017 | Lokshin | G11B 27/28 |
| 2017/0154212 A1* | 6/2017 | Feris | G06T 7/13 |
| 2017/0168586 A1* | 6/2017 | Sinha | G06N 20/00 |
| 2017/0277977 A1* | 9/2017 | Kitamura | G06T 7/11 |
| 2017/0337690 A1 | 11/2017 | Arth et al. | |
| 2018/0089536 A1* | 3/2018 | Feng | G06K 9/00805 |
| 2018/0165831 A1* | 6/2018 | Kwant | G05D 1/0251 |
| 2018/0189974 A1* | 7/2018 | Clark | G06T 7/70 |
| 2018/0232583 A1* | 8/2018 | Wang | G06K 9/628 |
| 2018/0293466 A1* | 10/2018 | Viswanathan | G05D 1/0246 |
| 2019/0026956 A1* | 1/2019 | Gausebeck | H04N 13/10 |
| 2019/0122406 A1* | 4/2019 | Wang | G06N 3/0445 |
| 2019/0126487 A1* | 5/2019 | Benaim | B25J 9/1697 |
| 2019/0130216 A1* | 5/2019 | Tomioka | G06K 9/6267 |
| 2019/0147621 A1* | 5/2019 | Alesiani | G06T 7/50 382/190 |
| 2019/0163989 A1* | 5/2019 | Guo | G08G 1/167 |
| 2019/0164018 A1* | 5/2019 | Zhu | G06T 7/11 |
| 2019/0251401 A1* | 8/2019 | Shechtman | G06T 11/00 |
| 2019/0325605 A1* | 10/2019 | Ye | G06T 7/73 |
| 2019/0347526 A1* | 11/2019 | Sunkavalli | G06K 9/46 |
| 2020/0058389 A1* | 2/2020 | Saalbach | G06N 3/04 |
| 2020/0134375 A1* | 4/2020 | Zhan | G06K 9/6259 |
| 2020/0158869 A1* | 5/2020 | Amirloo Abolfathi | G01S 7/497 |
| 2020/0184647 A1* | 6/2020 | Harrison | G06T 7/174 |
| 2020/0210769 A1* | 7/2020 | Hou | G06K 9/00798 |
| 2020/0226777 A1* | 7/2020 | Luo | G06T 7/85 |
| 2020/0334490 A1* | 10/2020 | Shen | G06N 20/00 |
| 2020/0412937 A1* | 12/2020 | Huang | H04N 5/23219 |

FOREIGN PATENT DOCUMENTS

| | | |
|---|---|---|
| CN | 107564012 A | 1/2018 |
| EP | 3133557 A1 | 2/2017 |
| JP | 2017041242 A | 2/2017 |
| WO | 2017200662 A1 | 11/2017 |

OTHER PUBLICATIONS

Arnab et al., "Higher Order Conditional Random Fields In Deep Neural Networks," in European Conference on Computer Vision (ECCV), 2016. (24 pgs).
G. Bhorkar, "A Survey Of Augmented Reality Navigation," CoRR, abs/1708.05006, 2017. (6 pgs).
Brostow et al., "Semantic Object Classes In Video: A High-Definition Ground Truth Database," PR, 30(2):88-97, 2009. (10 pgs).
Byeon et al., "Scene La-Beling With LSTM Recurrent Neural Networks," In CVPR, pp. 3547-3555, 2015.(9 pgs).
Campbell et al., "Globally-Optimal Inlier Set Maximisation For Simultaneous Camera Pose and Feature Correspondence," In ICCV, 2017. (10 pgs).
Chen et al., "Rethinking Atrous Convolution For Semantic Image Segmentation," CoRR, abs/1706.05587, 2017. (14 pgs).
Chen et al., "MXNet: A Flexible And Efficient Machine Learning Library For Heterogeneous Distributed Systems," CoRR, abs/1512.01274, 2015. (6 pgs).
Clark et al.,"VidLoc: 6-Dof Video-Clip Relocalization," In CVPR, 2017. (9 pgs).
Cordts et al., "The Cityscapes Dataset For Semantic Urban Scene Understanding," In CVPR, 2016. (11 pgs).
Coskun et al., "Long Short-Term Memory Kalman Filters: Recurrent Neural Estimators for Pose Regularization," In ICCV, 2017. (9 pgs).
David et al.,"SoftPOSIT: Simultaneous Pose and Correspondence Determination," IJCV, 59(3):259-284, 2004. (26 pgs).
Dosovitskiy et al., "FlowNet: Learning Optical Flow with Convolutional Networks," In ICCV, pp. 2758-2766, 2015. (9 pgs).
T. Dozat, "Incorporating Nesterov Momentum Into Adam," In ICLR, 2016. (4 pgs).
Eigen et al., "Predicting Depth, Surface Normals and Semantic Labels with a Common Multi-Scale Convolutional Architecture," In ICCV, 2015. (9 pgs).
Engel et al., "LSD-SLAM: Large-Scale Direct Monocular SLAM," In ECCV, 2014. (16 pgs).
Gadde et al., "Semantic Video CNNs through Representation Warping," In ICCV, 2017. (10 pgs).
Geiger et al., "Are We Ready For Autonomous Driving? The KITTI Vision Benchmark Suite," In CVPR, 2012. (8 pgs).
Hane et al.,"Joint 3D Scene Reconstruction and Class Segmentation," In CVPR, pp. 97-104, 2013. (8 pgs).
Haralick et al., "Review and Analysis Of Solutions Of The Three Point Perspective Pose Estimation Problem," In IJCV, 13(3):331-356, 1994. (26 pgs).
Walch et al., "Image-Based Localization Using LSTMs for Structured Feature Correlation," In ICCV, 2017. (10 pgs).
He et al.,"Deep Residual Learning For Image Recognition," In CVPR, 2016. (9 pgs).
R. E. Kalman, "A New Approach To Linear Filtering And Prediction Problems," Journal of basic Engineering, 82(1):35-45,1960. (11 pgs).
Kendall et al.,"Geometric Loss Functions For Camera Pose Regression With Deep Learning," In CVPR, 2017.(10 pgs).
Kendall et al.,"PoseNet: A Convolutional Network For Real-Time 6-DOF Camera Relocalization," In ICCV, 2015. (9 pgs).
Kneip et al., "UPnP: An Optimal O(n) Solution To The Absolute Pose Problem With Universal Applicability," In ECCV, pp. 127-142. Springer, 2014. (16 pgs).
Kundu et al., "Joint Semantic Segmentation And 3D Reconstruction From Monocular Video," In ECCV, pp. 703-718. Springer, 2014.(16 pgs).

(56) References Cited

OTHER PUBLICATIONS

Kundu et al., "Feature Space Optimization For Semantic Video Segmentation," In CVPR, pp. 3168-3175, 2016. (8 pgs).
Laskar et al., "Camera Relocalization by Computing Pairwise Relative Poses Using Convolutional Neural Network," In CVPR, 2017. (10 pgs).
Lee et al.,"GPS/DR Error Estimation for Autonomous Vehicle Localization," Sensors, 15(8):20779-20798, 2015. (20 pgs).
Moreno-Noguer et al.,"Pose Priors for Simultaneously Solving Alignment and Correspondence," In ECCV, pp. 405-418, 2008. (14 pgs).
Mur-Artal et al.,"ORB-SLAM: A Versatile and Accurate Monocular SLAM System," In IEEE Trans-actions on Robotics, 31(5):1147-1163, 2015. (17 pgs).
Newcombe et al., "DTAM: Dense Tracking And Mapping In Real-Time," In ICCV, 2011. (8 pgs).
Ohno et al., "Outdoor Navigation Of A Mobile Robot Between Buildings Based On DGPS And Odometry Data Fusion," In IEEE, 2003. (2 pgs).
Paszke et al., "ENet: A Deep Neural Network Architecture for Real-Time Semantic Segmentation," In CoRR, abs/1606.02147, 2016. (10 pgs).
Pohlen et al., "Full-Resolution Residual Networks for Semantic Segmentation In Street Scenes," In CVPR, 2017. (10 pgs).
Richter et al., "Playing For Benchmarks," In ICCV, 2017. (10 pgs).
Ros et al., "The SYNTHIA Dataset: A Large Collection Of Synthetic Images For Semantic Segmentation Of Urban Scenes," In CVPR, 2016. (10 pgs).
Sattler et al., "Are Large-Scale 3D Models Really Necessary For Accurate Visual Localization?," In CVPR, 2017. (10 pgs).
Tateno et al., "CNN-SLAM: Real-Time dense monocular SLAM with learned depth prediction," In CVPR, 2017. (10 pgs).
Ummenhofer et al., "DeMoN: Depth and Motion Network for Learning Monocular Stereo," In CVPR, 2017. (10 pgs).
Vishal et al., "Accurate Localization By Fusing Images And GPS Signals,". In CVPR, pp. 17-24, 2015. (8 pgs).
Wang et al., "TorontoCity: Seeing The World With a Million Eyes," arXiv preprint arXiv:1612.00423, 2016. (9 pgs).
C. Wu, "Visualsfm: A Visual Structure From Motion System,"[online], [retrieved Apr. 25, 2018]. Retrieved from Internet <URL: http://ccwu.me/vsfm/> (2 pgs).
Wu et al., "Google's Neural Machine Translation System: Bridging The Gap between Human and Machine Translation," arXiv preprint arXiv:1609.08144, 2016. (23 pgs).
Wu et al., "Wider Or Deeper: Revisiting the ResNet Model for Visual Recognition," In CoRR, abs/1611.10080, 2016. (19 pgs).
Zhao et al., "ICNet for Real-Time Semantic Segmentation on High-Resolution Images," In CoRR, abs/1704.08545, 2017.(9 pgs).
Zhao et al., "Pyramid Scene Parsing Network," In CVPR, 2017. (10 pgs).
Zhu et al., "Deep Feature Flow For Video Recognition," In CVPR, 2017. (10 pgs).
International Search Report dated Oct. 25, 2018, in International Application No. PCT/CN2018/075994, filed Feb. 9, 2018 (3pgs).
Written Opinion dated Oct. 25, 2018, in International Application No. PCT/CN2018/075994, filed Feb. 9, 2018 (3pgs).

\* cited by examiner

700

SYSTEMS AND METHODS FOR DEEP LOCALIZATION AND SEGMENTATION WITH A 3D SEMANTIC MAP

CROSS-REFERENCE TO RELATED APPLICATIONS

This patent application is filed pursuant to 35 USC § 371 as a U.S. National Phase Application of International Patent Application No. PCT/CN2018/075994, filed on Feb. 9, 2018, entitled "SYSTEMS AND METHODS FOR DEEP LOCALIZATION AND SEGMENTATION WITH A 3D SEMANTIC MAP," listing Peng Wang, Ruigang Yang, Binbin Cao, and Wei Xu as inventors, which patent document is incorporated by reference herein in its entirety and for all purposes.

TECHNICAL FIELD

The present application relates generally to systems, devices, and methods for image-based self-localization and scene parsing that may be used for various applications, such as visual-based navigation.

BACKGROUND

In applications such as robotic navigation or augment reality, visual-based 6-degrees-of-freedom (DOF) camera pose estimation, and concurrently parsing each frame of a video into semantically meaningful parts in real-time are key components, which attracts much attention in computer vision.

Currently, most state-of-the-art algorithms are trying to solve both tasks solely based on visual signals. For instance, geometry-based methods are relying on visual feature matching, e.g., systems of Perspective-n-Points (PnP) when a 3D map and an image are provided, or systems of simultaneous localization and mapping (SLAM) when video is provided. Such systems are relying on local appearance, which could fail when confronted with low-texture environments.

Most recently, deep learning-based methods, e.g., for either images or videos, have been developed for real-time localization, which show good trade-offs between accuracy and speed. Nevertheless, while those methods work well in environments with rich distinguishable features, such as those in the Cambridge landmarks dataset, they could fail for common street views with very similar appearances or even repetitive structures.

For scene parsing, approaches based on a deep fully convolutional network (FCN) with ResNet are the better-performing algorithms for single image input. When the input is video, researchers may incorporate the optical flow between consecutive frames, which not only accelerates the parsing, but also improves temporal consistency. Furthermore, for static background, one may use structure-from-motion (SFM) techniques to jointly parse and reconstruct. However, these methods can still be fragile in practice.

Accordingly, what is needed are systems and methods that overcome the shortcomings of existing approaches.

SUMMARY

Embodiments of the present application provide a method for using a network to perform joint scene parsing and camera pose estimation, a system for joint scene parsing and camera pose estimation, and a method for training a network to perform joint scene parsing and camera pose estimation.

In an aspect of the application, the method for using a network to perform joint scene parsing and camera pose estimation comprises: receiving semantic map data, image data associated with a camera, and sensor data that comprises a coarse camera pose; creating a first semantic label map by using the coarse camera pose and a camera intrinsic parameter; providing both the image data and the first semantic label map to a first pose network to obtain a corrected camera pose; and inputting the image data into a segment network to generate a two-dimensional parsing associated with the inputted image.

In another aspect of the application, the system for joint scene parsing and camera pose estimation comprises: a camera that has an intrinsic parameter and generates image data; a sensor that generates sensor data comprising a coarse camera pose; a processor comprising instructions that when executed create a first semantic label map based on semantic map data, the image data, and the sensor data; a first pose network that in response to receiving the image data and the first semantic label map generates a corrected camera pose; and a segment network that, based on the image data, generates a two-dimensional parsing that is associated with the inputted image.

In a further aspect of the application, the method for training a network to perform joint scene parsing and camera pose estimation comprises: receiving semantic map data, image data associated with a camera, and sensor data that comprises a coarse camera pose; creating a semantic label map by using the coarse camera pose and a camera intrinsic parameter; providing both the image data and the semantic label map to a first pose network to obtain a corrected camera pose; inputting the image data into a segment network to generate a two-dimensional parsing associated with the inputted image; and using a loss that comprises a weight factor that depends on the semantic class.

BRIEF DESCRIPTION OF THE DRAWINGS

References will be made to embodiments of the application, examples of which may be illustrated in the accompanying figures. These figures are intended to be illustrative, not limiting. Although the application is generally described in the context of these embodiments, it should be understood that it is not intended to limit the scope of the application to these particular embodiments. Items in the figures may be not to scale.

DETAILED DESCRIPTION OF EMBODIMENTS

Figure 1:
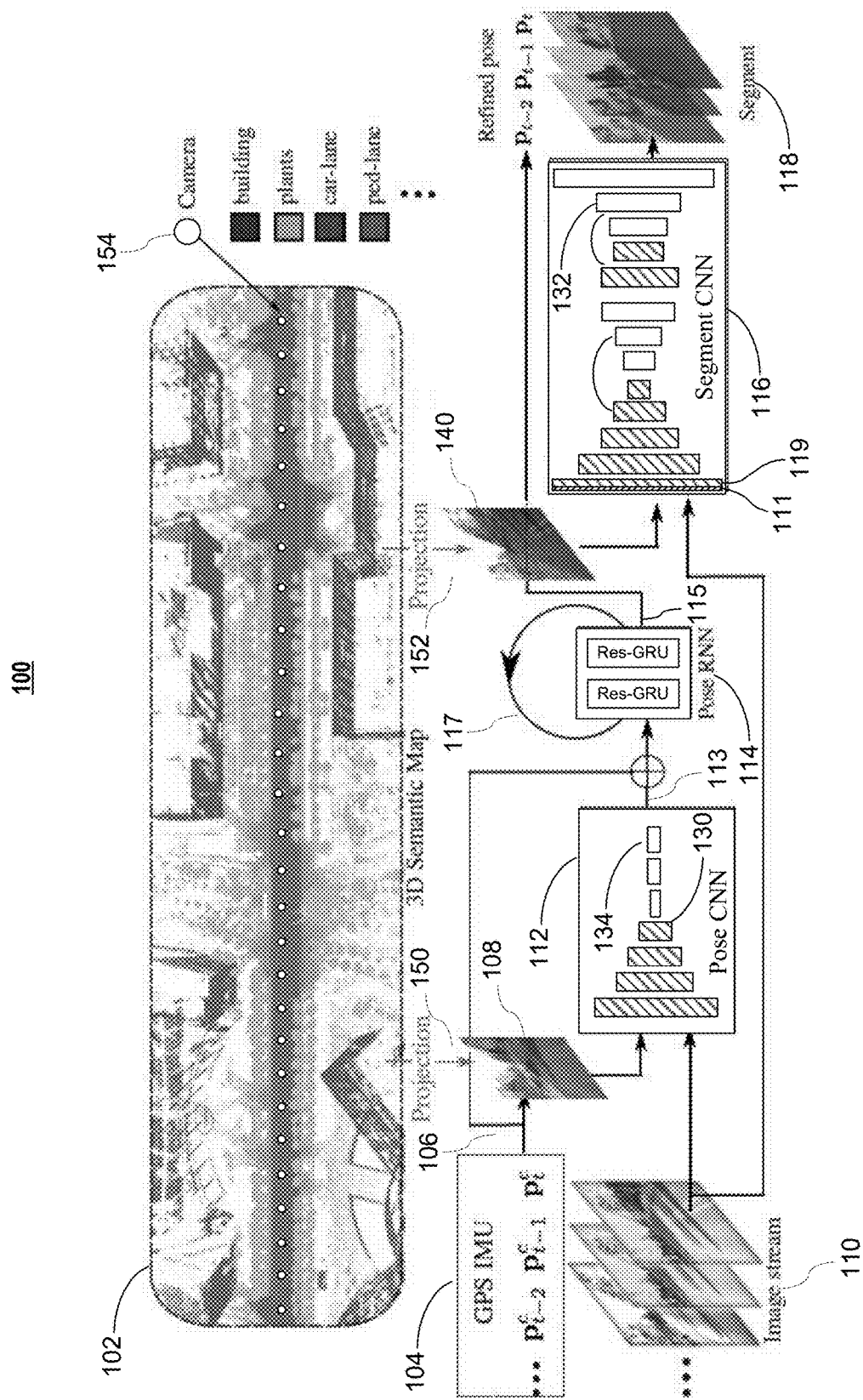
FIG. 1 depicts a framework according to embodiments of the present disclosure.

In the following description, for purposes of explanation, specific details are set forth in order to provide an understanding of the application. It will be apparent, however, to one skilled in the art that the application can be practiced without these details. Furthermore, one skilled in the art will recognize that embodiments of the present application, described below, may be implemented in a variety of ways, such as a process, an apparatus, a system, a device, or a method on a tangible computer-readable medium.

Components, or modules, shown in diagrams are illustrative of exemplary embodiments of the application and are meant to avoid obscuring the application. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the application and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

In this document, the term "prior" refers to prior knowledge, including human knowledge. "Online" refers to a dependency on past and current events, as compared to a dependency on future events.

A. General Introduction

Embodiments presented herein are aimed at solving camera localization and scene parsing problems from a more practical standpoint. Certain embodiments assume the presence of (a) a global positioning system (GPS)/inertial measurement unit (IMU) signal to provide a rough location estimate; and (b) a three-dimensional (3D) semantic map for the static environment. The GPS/IMU signal, even though noisy, may serve as the pose prior for a deep-learning based pose estimation system. The 3D semantic map, which may be rendered to a semantic label map for a given pose, may provide strong priors for scene parsing and also help to maintain temporal consistency.

In fact, certain embodiments transform the task of two-dimensional (2D) location estimation using a 2D label map into a 3D camera pose task that uses a 3D semantic map. Due to the accelerated development of autonomous driving, city-scale 3D semantic maps, such as the Toronto City dataset, are being collected and built. Certain embodiments use a dataset that comprises high quality 3D semantic map and that has been constructed by using a high-accuracy mobile light detection and ranging (LIDAR) device.

It is noted that within the presented deep learning framework embodiments, camera poses and scene semantics are mutually beneficial. The camera poses may help to establish the correspondences between the 3D semantic map and 2D semantic label map. Conversely, scene semantics could help refine camera poses. A unified framework yields better results, in terms of both accuracy and speed, for both tasks when compared to performing them individually. In experiments using a single core Titan Z graphics processing unit (GPU) (e.g., an Nvidia Titan Z graphics card by NVIDIA of Santa Clara, Calif.), the disclosed networks and systems can estimate pose within 10ms with an error rate less than 1 degree, and segment a 512×608 image within 90ms with a pixel accuracy of about 96% without model compression, which demonstrates the efficiency and effectiveness of embodiments of the presented systems and methods.

1. Framework

A framework embodiment of the methods and systems presented herein is illustrated in FIG. 1. System 100 in FIG. 1 shows map 102, GPS/IMU input 104, images 110, coarse semantic label map 108, pose networks 112 and 114, segmentation network 116, and refined semantic label map 140. In embodiments, map 102 represents a pre-built or pre-recorded 3D semantic map. Different shades of grey within map 102 represent different semantic regions, such as buildings car-lanes, and plants. Arrows 150, 152 indicate a rendering (projection) operation in training and inference; other arrows indicate the testing/use process. Tetrahedron symbol 154 indicates camera location within 3D map 102. In embodiments, convolutions (e.g., 130), deconvolutions (e.g., 132), and fully connected layers (e.g., 134) in networks 112, 116 are used to calculate a relative difference between label map 108, 140 and image 110. In embodiments, the input to system 100 comprises a sequence of images 110 and corresponding GPS/IMU signals 104, and the output may be semantically segmented image(s) 118, each associated with a refined pose. In embodiments, these semantically labeled 2D images 118 improve alignment with image 110 and increase segmentation accuracy between frames.

In embodiments, given a camera pose within a 3D point cloud, the 3D points may be projected into a 2D map. In embodiments, during testing, images 110, e.g., an online stream of images from a set of video frames, and corresponding coarse camera poses 106 that may be obtained from consumer-grade GPS/IMU 104 and, one or more parameters, such as intrinsic camera parameters, may be input into system 100. In embodiments, based on coarse camera pose 106, for each frame 110, coarse semantic label map 108, e.g., an initial label map, may be rendered using 3D semantic map 102. In embodiments, semantic label map 108 may be fed into pose network 112, e.g., a CNN, jointly with respective image 110. Pose network 112 may calculate relative rotation and translation to yield corrected camera pose 113. In embodiments, to build temporal correlations, the corrected poses 113 may be fed into a RNN, e.g., a multi-layer pose RNN 114, which further improves the pose accuracy in the stream and provides higher order temporal information. In embodiments, given the rectified or corrected camera pose 113, refined rendered label map 140 may be generated. Refined label map 140 together with image 110 may be input to a segmentation network, e.g., segmentation CNN 116, which helps to segment a spatially more accurate and temporally more consistent result for the stream of images 110, for example, to output a per-pixel semantic label. In embodiments, in system 100, the data contains ground truths for pose CNN 112, pose RNN 114, and/or segment CNN 116, such that system 100 may be trained with strong supervision at output 113, 115, and/or 110.

B. Related Work

Estimating camera pose and parsing images from a video or a single image have long been center problems for computer vision and robotics. It is noted that while localization and parsing applications herein are discussed in the context of autonomous driving and navigation with a focus on outdoor cases with street-level input, this is not intended as a limitation on the scope of the present disclosure as the methods and systems described herein are equally beneficial to other applications and environments, for example, areal navigation.

Camera pose estimation. Traditionally, localizing an image given a set of 3D points within a 3D point cloud is formulated as a Perspective-n-Point (PnP) problem by matching feature points in 2D and features in 3D through cardinality maximization. Usually, in a large environment, a pose prior is required in order to obtain good estimation. Some authors have proposed a global-optimal solver that leverages the prior. For cases in which geo-tagged images are available, others have proposed methods that use image-retrieval. When given a video, relative pose could be further modeled with methods like simultaneous localization and mapping (SLAM), which increases localization accuracy and speed.

Although these methods are effective in scenarios with distinguished feature points, they are still not practical for city-scale environments with billions of points, and they may also fail in areas with low texture, repeated structures, and occlusions. Thus, recently, deep learned features with CNN are proposed to combine low-level and high-level feature for localization. PoseNet takes a low-resolution image as input, which can estimate pose in 10ms with respect to a feature rich environment composed of distinguished landmarks. Long short-term memory (LSTM)-PoseNet further captures a global context after CNN features. Given a video, other approaches incorporate Bi-Directional LSTM or Kalman filter LSTM to obtain better results with temporal information. However, in street-view scenarios, considering a road with trees aside, in most cases, no significant landmark appears, which could fail the visual models. Thus, although noisy, signals from GPS/IMU can aid localization in these cases, whereas the problem changes to estimating the relative pose between the camera view of a noisy pose and the real pose. For tackling relative pose of two images taken at a same scene, recently, some researchers have proposed to concatenate the two images as a network input. In contrast, in embodiments, a recorded input image is concatenated with an online rendered label map from the noisy pose, which provides superior results in experiments.

Scene parsing. For parsing a single image of street views (e.g., these from CityScapes), most state-of-the-art algorithms are designed based on a FCN and a multi-scale context module with dilated convolution, pooling, Conditional Random Fields (CRF), or spatial RNN. However, these are dependent on a ResNet having hundreds of layers, which is too computationally expensive for applications that require real-time performance. Some researchers apply small models or model compression for acceleration at the cost of reduced accuracy. When the input is video and a spatial-temporal graph is built, some approaches use 3D dense CRF to obtain temporally consistent results. Recently, optical flow between consecutive frames has been computed to transfer labels or features from the previous frame to the current one. Significant progress has been made, yet the consistency is built through flow rather than 3D information and the camera pose, which are more compact for static background. In contrast, embodiments of the present disclosure use a projection from a 3D semantic map as a prior to alleviate the difficulties involved in scene parsing that is solely based on image cues. In embodiments, a light-weight network from depth and motion network (DeMoN) is adopted to allow for fast inference.

Joint 2D-3D for video parsing. Other approaches include joint reconstruction, pose estimation, and parsing through 2D-3D consistency supervised training. Traditionally, those methods rely on structure-from-motion (SFM) from feature or photometric matching. Specifically, such methods reconstruct a 3D map and perform semantic parsing over 2D and 3D jointly to yield consistent segmentation between multiple frames. Most recently, CNN-SLAM replaced the traditional 3D reconstruction framework with one depth network from a single image and one segment network for image parsing. However, all these approaches are processed offline and only for static background, which is incompatible with online applications. Moreover, the quality of a reconstructed 3D model is not comparable with the quality of data collected by a 3D scanner.

C. Dataset Preparation

Motivation. As described in the General Introduction. Sec. A.1, embodiments are designed to work with available motion sensors and a 3D semantic map. However, existing outdoor datasets, such as KITTI and CityScapes, do not contain such information, in particular, 3D map data; and the Toronto City dataset has not been made public yet. Table 1 summarizes several key properties that are used in experiments, discussed in greater detail in Sec. E. Note that none of the existing public datasets satisfy those properties.

TABLE 1

| Dataset | Real data | Camera pose | 3D semantic map | Video per-pixel label |
|---------|-----------|-------------|-----------------|----------------------|
| CamVid  | ✓         | —           | —               | —                    |
| KITTI   | ✓         | ✓           | sparse points   | —                    |

TABLE 1-continued

| Dataset | Real data | Camera pose | 3D semantic map | Video per-pixel label |
|---|---|---|---|---|
| CityScapes | ✓ | — | — | selected frames |
| Toronto | ✓ | ✓ | 3D building & road | selected pixels |
| Synthia | — | ✓ | — | ✓ |
| P.F.B. | — | ✓ | — | ✓ |
| Ours | ✓ | ✓ | dense point cloud | ✓ |

Table 1 is a comparison between the dataset as used in various embodiments and other outdoor street-view datasets. The term "real data" refers to whether the data is collected in the physical world. "3D semantic map" indicates whether the data comprises a 3D map of scenes comprising semantic labels. "Video per-pixel label" indicates whether the data comprises per-pixel semantic labels.

Figure 2:
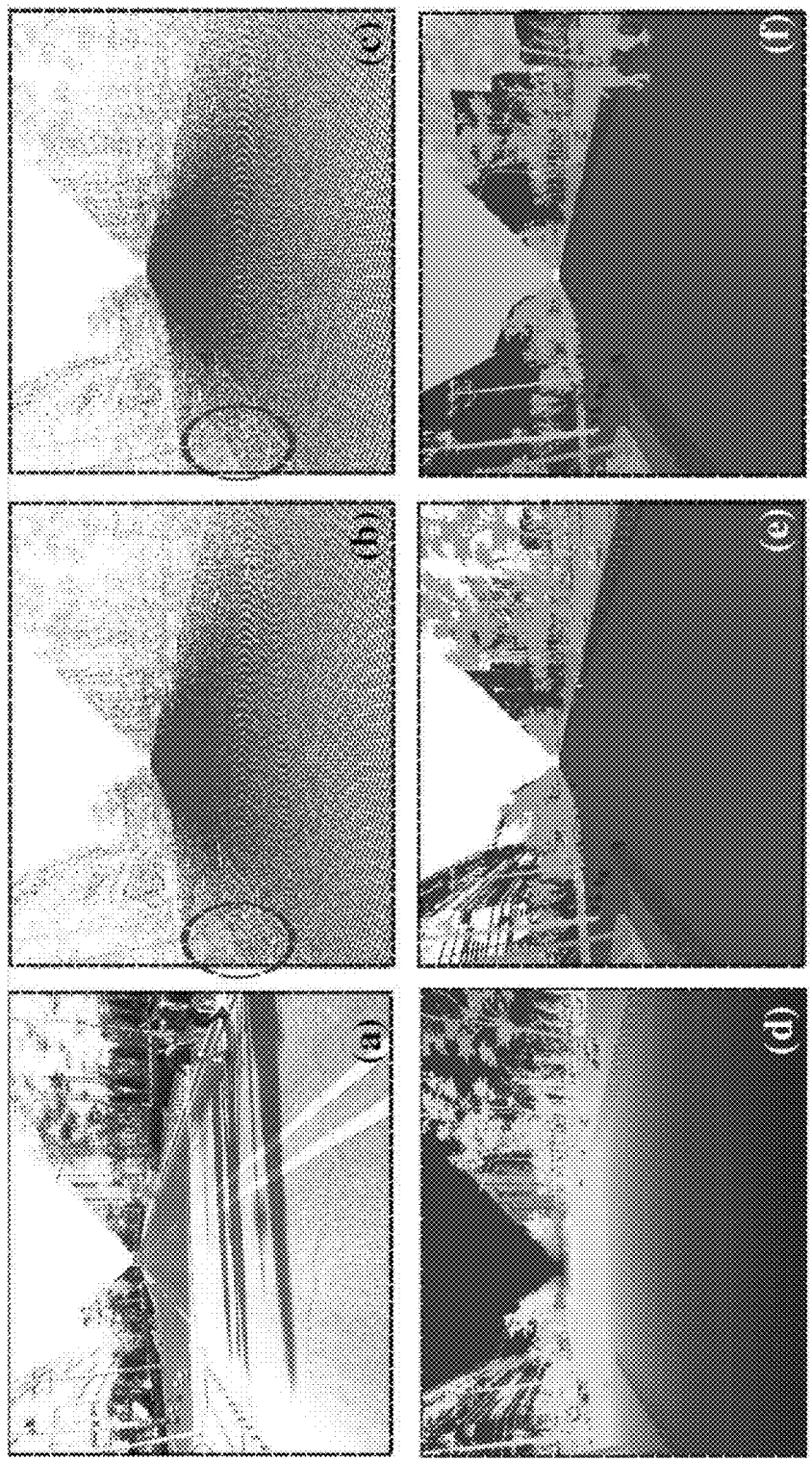
FIG. 2 depicts examples of a collected street-view dataset, according to embodiments of the present disclosure.

Data collection. Embodiments use a mobile LIDAR scanner, e.g., a commercial scanner made by Riegl USA, Inc., Orlando, Fla., to collect, with high granularity, point clouds of a static 3D map. FIG. 2 depicts examples of a collected street-view dataset, according to embodiments of the present disclosure. FIG. 2(a) is a collected image.

As shown in FIG. 2(a), the captured point cloud density is relatively higher than that captured by the Velodyne laser scanner used for the KITTI dataset. Unlike the sparse Velodyne LIDAR, embodiments use the mobile LIDAR scanner that utilizes two laser beams to scan vertical circles. As the acquisition vehicle moves, it scans its surroundings using a push-broom camera. However, moving objects, such as vehicles and pedestrians, may be compressed, expanded, or completely missing from the captured point clouds.

FIG. 2(b) illustrates a rendered label map with 3D point cloud projection. The ellipses in FIG. 2(b) indicates a moving object (a rider). In order to eliminate inaccuracies associated with moving objects, embodiments of the present disclosure: 1) repeatedly scan a same road segment; 2) align and fuse point clouds; and/or 3) remove points with low temporal consistency. Formally, the condition to keep a point x in round j is, $$\Sigma_{i=0}^{r} \mathbb{1}(\exists \|x_i - x_j\| < \epsilon_d) \geq \delta \quad \text{(Eq. 1)}$$

where $\delta = 0.7$ and $\epsilon_d = 0.025$ in experiments, and $\Pi(\ )$ is an indicator function. In embodiments, refined point clouds may be kept as a static background $\mathcal{M}$ for further labeling.

In embodiments, for video capturing, two frontal cameras, e.g., having a resolution of 2048×2432, may be used. It is understood that the entire system, including the LIDAR scanner and cameras, should be well calibrated.

2D and 3D labeling. In order to have semantic labeling of each video frame, in embodiments, static background, static objects (e.g., parked vehicles that may be readily recognized in point clouds), and moving objects may be handled separately. For example, for static background, labeling may be performed directly on 3D point clouds, $\mathcal{M}$, that may then be projected to images to yield labeled background for the frames. In embodiments, point clouds may be over-segmented into point clusters, e.g., based on spatial distances and normal directions, and each cluster of points may be manually labeled. In embodiments, for static objects, e.g., in each round, the points of static background may be pruned out, and the remaining points of the objects may be labeled. In embodiments, only moving objects remain unlabeled after 3D-2D projection. Such embodiments adopt an active labeling strategy by first training an object segmentation model using a known algorithm and, then, manually refining the masks of moving objects.

FIG. 2(c) illustrates a rendered label map with 3D point cloud projection after points with low temporal consistency have been removed. As shown in FIG. 2(c), labels obtained by using the above steps may still not be perfect. For example, there may be some unlabeled pixels that may be caused by missed points or by reflection effects. Therefore, certain embodiments may use splatting techniques that expand points in a 3D point cloud into small 2D squares, as will be discussed in greater detail in Sec. D.1 and with reference to FIG. 2(e), which illustrates a rendered depth map of background and a rendered label map after class-dependent splatting in 3D point clouds.

In embodiments, the results are further refined to generate the final labels. FIG. 2(f) illustrates a merged label map with missing regions in-painted (i.e., manually filled-in), such as moving objects, sky, and other regions having no label projected from the 3D semantic map. With such a strategy, labeling efficiency and accuracy can be greatly increased. For example, labeling texture-rich regions, such as those having trees and poles may be very labor-intensive, especially in the presence of occlusion.

D. Localizing Camera and Scene Parsing

As previously discussed in Sec. A.1, various methods and systems for deep localization and segmentation presented herein are based on a 3D semantic map and deep networks. The following paragraphs describe how a semantic label map may be rendered from a 3D semantic map, discuss the details of various network architectures, and discuss the loss functions used to train an entire system.

1. Render a Label Map from a Camera Pose

Formally, given a 6-DOF camera pose $p = [q, t] \in SE(3)$, where $q \in SO(3)$ is the quaternion representation of rotation and $t \in \mathbb{R}^3$ is translation, a label map can be rendered from a 3D semantic map, e.g., where z-buffer is applied to find the closest point at each pixel.

In embodiments, the 3D map may be a point cloud-based environment. Although the density of the point cloud may be relatively high (e.g., one point per 25mm within road regions), when the 3D points are relatively far away from the camera, the projected points may be sparse, e.g., regions of buildings shown in FIG. 2(c). Thus, in embodiments, for each point in an environment, a splatting technique used in computer graphics may be adopted, by expanding the 3D point to a square, such that the size of the square is determined by its semantic class. Formally, for a 3D point x belonging to a class c, its square size $s_c$ is set to be proportional to the class' average distance to the camera. Formally, $$s_c \propto \frac{1}{|P_C|} \Sigma_{x \in P_C} \min_{t \in \mathcal{T}} d(x, t) \quad \text{(Eq. 2)}$$

where $P_C$ is the set of 3D points that belong to class c, and $\mathcal{T}$ is the set of ground truth camera poses. Then, given the relative square size between different classes, in order to obtain the absolute size for rendering, an absolute range may be defined. This is non-trivial since a too large size may result in dilated edges, while a too small size may yield many holes. In experiments, the range has been set to [0.025, 0.05], which provided a relatively high visual quality.

As shown in FIG. 2(e), invalid values in-between those projected points are in-painted, while the boundaries separating different semantic classes are also preserved. As discussed further below, in embodiments, a rendered label map is input to the pose CNN to aid the network to localize the camera.

2. Camera Localization with Motion Prior

Translation rectification with road prior. One common localization prior for navigation is to use a 2D road map and constrain GPS signals to those that correspond to regions that identify a road. It is noted that once a GPS signal falls outside of road regions, the rendered label map may be completely different from the street-view of the camera, such that no correspondence may be found by the network. Therefore, in embodiments, a constraint is implemented, by rendering a 2D road map image with a rasterization grid of 0.05m from a 3D semantic map by using road points, i.e., points that are known to indicate a car-lane, pedestrian-lane, a bike-lane, etc. Then, for pixels $[x, y] \in \mathbb{Z}^2$ in the 2D map, an offset value $f(x, y)$ may be pre-calculated indicating its 2D offset to the closest pixel that belongs to the road. In embodiments, $f()$ may be calculated very efficiently, e.g., with a breath-first-search algorithm.

During online testing, given a noisy translation $t=[t_x, t_y, t_z]$, the closest road points w.r.t. t may be found using $[t_x, t_y]+f(\lfloor t_x \rfloor, \lfloor t_y \rfloor)$ from the pre-calculated offset function. Now referring to FIG. 1, in embodiments, based on rectified (i.e., corrected) camera pose 113, a semantic label map 108 may be rendered, which may then be fed back to pose CNN 112.

CNN-GRU pose network architecture. As shown in FIG. 1, the pose network architecture may comprise pose CNN 112 and pose GRU-RNN 114 having recurrent connections 117. In embodiments, CNN 112 of the pose network received as input image, I, 110 and rendered label map, L, that is based on a corresponding coarse camera pose 106 $p_i^c$. In embodiments, pose CNN 112 outputs a 7-dimensional vector $\hat{p}_i$ 113 that represents the relative pose between image 110 and rendered label map 108, such that the pose with respect to the 3D semantic map 102 may be obtained by using $p_i = p_i^c + \hat{p}_i$. For the network architecture of pose CNN 112 to use a large convolutional kernel to obtain larger context while keeping the number of parameters and runtime manageable, the design of DeMoN may be followed. In embodiments, the convolutional kernel of network 112 may comprise a pair of 1D filters in y and x-direction and an encoder that gradually reduces the spatial resolution, e.g., with a stride of 2, while increasing the number of channels.

Figure 3:
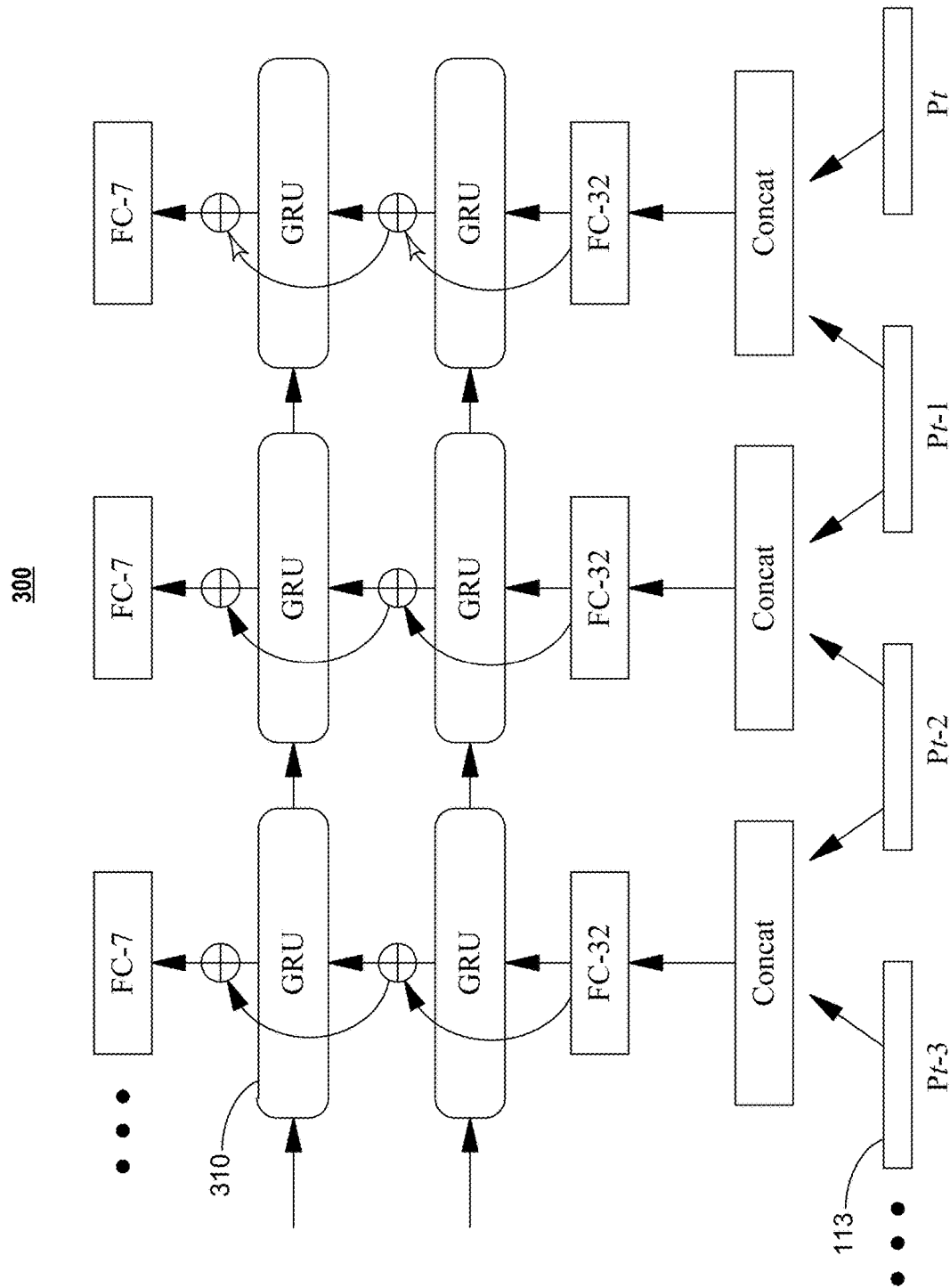
FIG. 3 illustrates a gated recurrent unit-recurrent neural network (GRU-RNN) network architecture for modeling a sequence of camera poses according to embodiments of the present disclosure.

In embodiments, since the input is a stream of images, in order to model the temporal dependency, after pose CNN 112, multi-layer GRU 114 with residual connection may be appended. FIG. 3 illustrates a GRU-RNN network architecture for modeling a sequence of camera poses according to embodiments of the present disclosure. In embodiments, GRU-RNN 300 comprises a two-layer GRU 310 that may have, e.g., 32 hidden states and may facilitate high order interaction beyond nearby frames, thereby, improving pose estimation performance. Unlike traditional navigation applications for estimating 2D poses, which commonly apply Kalman filtering by assuming either constant velocity or constant acceleration, in embodiments, transition of camera poses may be learned from the training sequences, as the speed of vehicle may be unknown. Experiments demonstrate that motion predicted by using an RNN is more accurate than by using a Kalman filter, which assumes constant speed. Advantageously, RNN 300 yields further improvements over the estimated poses obtained by pose CNN 112 in FIG. 1. It is noted that corrected camera pose 113 is labeled with the same numeral as in FIG. 1.

Pose loss. In embodiments, geometric matching loss may be used for training to avoid the balancing factor between rotation and translation. Formally, given a set of points in a point cloud in 3D $P=\{x\}$, the loss for each image may be written as:

$$L(p, p^*)=\Sigma_{x \in P} \omega_{l_x} |\pi(x, p) - \pi(x, p^*)|_2 \quad \text{(Eq. 3)}$$

where p and $p^*$ are the estimated pose and ground truth pose, respectively; $\pi()$ is a projective function that maps a 3D point x to 2D image coordinates; $l_x$ is the semantic label of x; and $\omega_{l_x}$ is a weight factor dependent on the semantics. In embodiments, stronger weights for point clouds belonging to certain classes, such as traffic light, are set to help the pose CNN to achieve better performance. In some existing approaches, the 3D points visible to the camera are used by this loss to avoid very large numbers and to ensure the stableness of training. However, online searching of visible 3D points among millions of data points is rather impractical. Thus, certain embodiments pre-render a depth map for each training image, e.g., with a resolution of 256×304, based on its ground truth pose, and use the back-projected 3D points from the depth map for training.

3. Video Parsing with Pose Guidance

Returning, now, to FIG. 1, having rectified pose 113 at hand, one may directly render the semantic 3D world to the view of a camera, yielding a semantic parsing of the current image. However, estimated pose 113 is generally less than perfect since finer regions (e.g., regions comprising light poles) may be at least partially misaligned. Other issues may include that many 3D points, such as regions indicating glass, may be missing (e.g., due to reflections), and points may be sparse at further distance. In addition, dynamic objects in the input may be not represented by the projected label map, thus, resulting in incorrect labeling. Thus, in embodiments, segment CNN 116 may be used to tackle these issues, while receiving rendered label map 140 as segment prior. Numeral 111 in FIG. 1 denotes a convolution from the projected label map.

Figure 4:
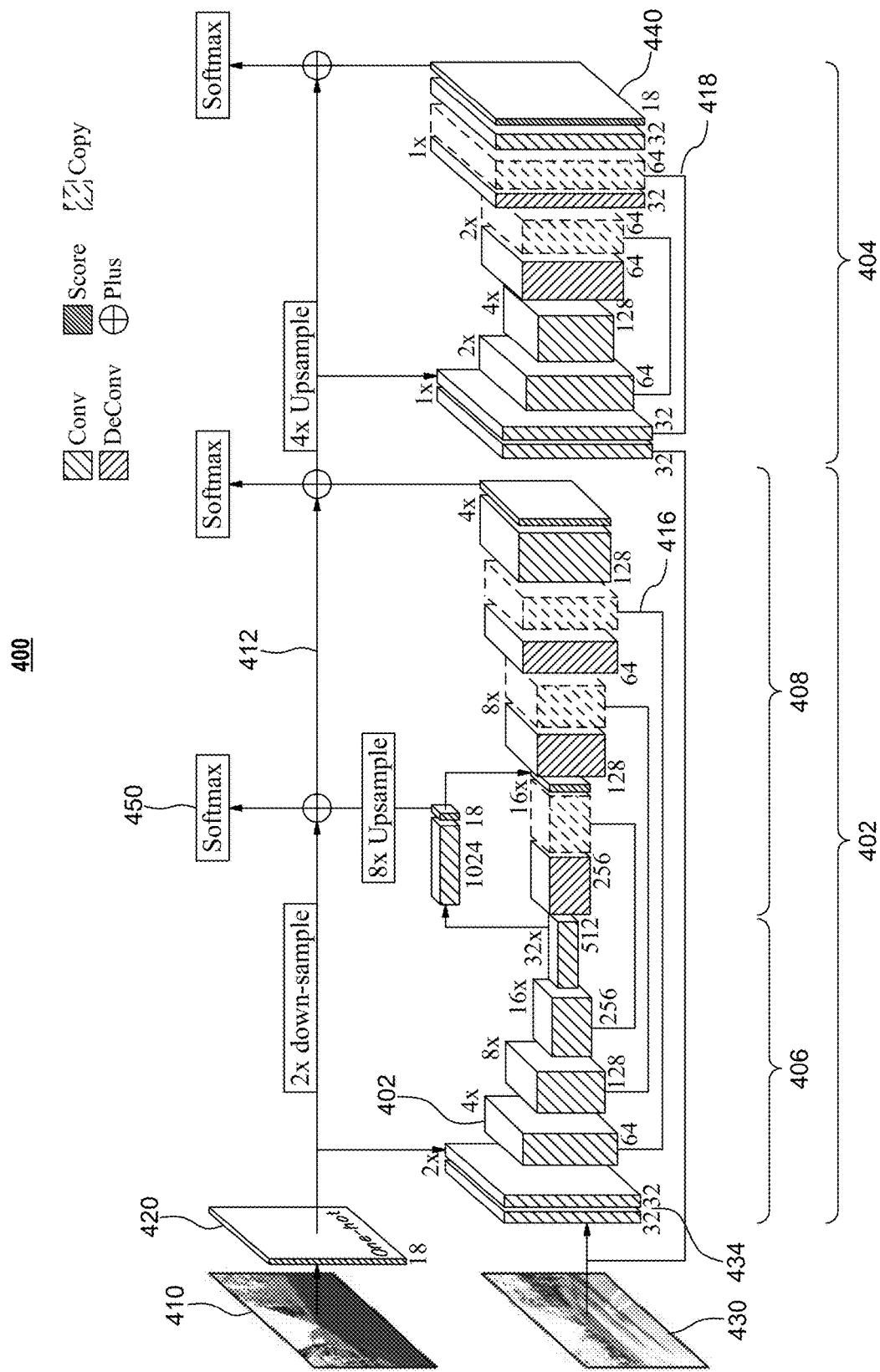
FIG. 4 illustrates an exemplary architecture of a segment convolutional neural network (CNN) according to embodiments of the present disclosure.

Segment network architecture. As discussed in Sec. B, heavily parameterized networks, such as ResNet, are not sufficiently efficient for online applications. FIG. 4 illustrates an exemplary architecture of a segment CNN according to embodiments of the present disclosure. In embodiments, segment CNN 400 uses rendered label map 410 as a segmentation prior. At the bottom of each convolutional block, the filter size is indicated, and at the top, the down-sample rates of each block is indicated with respect to the input image size. The text box labeled "softmax" (e.g., 450) indicates places at which a loss may be calculated.

As illustrated in FIG. 4, segment CNN 400 is a lightweight network that comprises encoder-decoder network 402 and refinement network 404. Both networks may have an architecture similar to those used in DeMoN, including 1D filters and mirror connections. However, since segment CNN 400 comprises segment prior 410, e.g., from a 3D semantic map, in embodiments, a residual stream 412 may be added to CNN 400. This encourages network 400 to learn the differences between the prior map and the ground truth.

In some existing designs, a full resolution stream is used to keep spatial details. In contrast, in segment CNN 400, rendered label map 410 also helps to keep the semantic spatial layout. Another notable difference between the encoder-decoder network in DeMoN is that for network inputs 410, 430 in FIG. 4, rather than directly concatenating label map 410 with input image 430, label map 410 may be first transformed to a score map 420, e.g., by one-hot operation, and the score of each pixel may be embedded into a 32-dimensional feature vector 434. In embodiments, feature vector 434 may be concatenated with the first layer output of image 430, where the input channel imbalance between image 430 and label map 410 is alleviated for segmentation.

In embodiments, for refinement network 404, the same strategy may be used to handle the two inputs 410, 430. Finally, segment network 400 may produce a score map 440, yielding the semantic parsing of a given image recorded by a camera.

In embodiments, segment network 400 is first trained with RGB images and then fine-tuned, e.g., by adding rendered label map 410. This is because when network 400 is trained from scratch, it may need a relatively large amount of data to effectively learn features from images. However, the rendered label map from the estimated pose may have on average, e.g., 70% pixel accuracy, such that only 30% of the pixels may be available to generate effective gradients. This small amount of trading data may cause the network to overfit to the input label map, while slowing down the process of learning features from images. Finally, for segmentation loss, the standard softmax loss may be used, and intermediate supervision may be added right after the outputs of both encoder 406 and decoder 408, as indicated in FIG. 4.

In embodiments, copies of the features (e.g., 416 and 418) from prior parts may be used. However, it shall be noted that this is an optional implementation, which need not be employed in other embodiments.

E. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Various embodiments may be implemented using an experimental dataset and validated, e.g., by evaluating several system settings for pose estimation and segmentation. For limited training data, such as GPS and IMU signals that comprise several scans for the same road segments, noisy GPS and IMU data maybe simulated, e.g., by adding random perturbations $\in$ with respect to the ground truth pose using a uniform distribution. In embodiments, translation and rotation noise may be set as $\in_t \sim U(0, 7.5m)$ and $\in_r \sim U(0°, 15°)$, respectively. It is noted that realistic data may be used when setting the noise range for the simulation.

In one embodiment, an acquisition vehicle may scan a technology park for several rounds at different times of the day. A 3D map generated having a certain road length, e.g., 3500m, may be generated with a distance between consecutive frames of about 5m to 10m. Four rounds of video camera images for training and two for testing may be used to yield 2242 training images and 756 testing images. In embodiments, the semantic classes (shown in FIG. 2), comprise {sky, car-lane, pedestrian-lane, bike-lane, curb, traffic-cone, traffic-stack, traffic-fence, light-pole, traffic-light, tele-pole, traffic-sign, billboard, building, security-stand, plants, object}. It is noted that any size of datasets and semantics may be constructed.

Implementation details. In embodiments, to quickly render from a 3D semantic map, OpenGL may be adopted to efficiently render a semantic label map with the z-buffer handling. A 512×608 image may be generated in 70ms with a single GPU (e.g., Nvidia Titan Z graphics card by NVIDIA of Santa Clara, Calif.), which may also be the input size for both the pose CNN and the segment CNN. According to various embodiments of the present disclosure, for the pose CNN, the filter sizes of the layers may be {32, 32, 64, 128, 256, 1024, 128, 7}, and the forward speed for each frame may be 9ms. In embodiments, for the pose RNN, sequences with a length of 100 may be sampled from training data with an average speed of 0.9ms for each frame. For the segment CNN, the size may be kept the same as the input, and the forward time may be 90ms. In embodiments, both networks may be learned using a "Nadam" optimizer with a learning rate of $10^{-3}$. The three models may be sequentially trained, e.g., due to GPU memory limitations. In one embodiment, for the pose CNN and the segment CNN, a stop may be placed at 150 epochs when there is no performance gain, and for pose RNN, a stop may be placed at 200 epochs. In embodiments, for data augmentation, the imgaug library may be used to add lighting, blurring, and flipping variations. In one embodiment, a subset of the training images may be kept for validating the trained model from each epoch, and the best performing model may be chosen for evaluation.

In embodiments, for testing, since input GPS/IMU varies, i.e., $p_i^c = p^* + \in$, a confidence range of prediction for both camera pose and image segment may be used in order to verify the improvement of individual components. In embodiments, the standard variation for 10 simulations is used to obtain a confidence range. In embodiments, the networks may be implemented by adopting the MXNet platform.

For pose evaluation, the median translation offset and median relative angle may be used. For evaluating segment, the commonly used pixel accuracy (Pix. Acc.), mean class accuracy (mAcc.), and mean intersect-over-union (mIOU) may be adopted.

Pose Evaluation. Table 2 illustrates the performance of estimated translation t and rotation r for different network model. In particular, Table 2 compares the accuracy of different settings for pose estimation. "Noisy pose" refers to a noisy GPS/IMU input signal, and "KF" indicates the use of a Kalman filter. The numbers following "±" indicate the standard variation for 10 simulations. the symbols "↓" and "↑" indicate improved results for respective "lower" and "higher" values. As Table 2 demonstrates, statistically significant improvement s may be achieved using various embodiments of the present disclosure.

TABLE 2

| Method | Trans (m) ↓ | Rot (°) ↓ | Pixel Accuracy (%) ↑ |
|---|---|---|---|
| PoseNet | — | — | — |
| Noisy pose | 33.45 ± 0.176 | 7.87 ± 1.10 | 54.01 ± 1.5 |
| Pose CNN w/o semantic | 1.355 ± 0.052 | 0.982 ± 0.023 | 70.99 ± 0.18 |
| Pose CNN w semantic | 1.331 ± 0.057 | 0.727 ± 0.018 | 71.73 ± 0.18 |
| Pose RNN w/o CNN | 1.282 ± 0.061 | 1.731 ± 0.06 | 68.10 ± 0.32 |
| Pose CNN w KF | 1.281 ± 0.06 | 0.833 ± 0.03 | 72.00 ± 0.17 |
| Pose CNN-RNN | 1.005 ± 0.044 | 0.719 ± 0.035 | 73.01 ± 0.16 |

In experiments, published code and geometric loss (Eq. (3)) of PoseNet were used to train a model. Due to scene appearance similarity of the street-view, no reasonable model was obtained, i.e., the results were no better than for using the noisy GPS/IMU signal. The 2nd row in Table 2 shows the median error of simulated GPS and IMU data according to various embodiments of the preset disclosure.

The 3rd row shows that, by using a pose CNN according to embodiments of the present disclosure, the model may learn relative pose between camera and GPS/IMU, which significantly reduces the error (60% for t, 85% for r). By adding semantic cues, i.e., road prior and semantic weights in Eq. (3), the pose errors may be further reduced, especially for rotation (from 0.982 to 0.727, as shown in row 4). In fact, the highest improvement stem from semantic weighting, while the road prior helped marginally in this experiment. It is noted that larger noise data and added data variations may improve the validation of different cues.

A video input was evaluated, for example, by setting up a baseline that performs RNN directly on a GPS/IMU signal. As shown at row 5 in Table 2 (denoted "Pose RNN w/o CNN"), the estimated t yielded even better results than for the pose CNN, while r was comparably worse. This result is expected since the speed of a camera is easier to capture temporally than its rotation. Another baseline that may be adopted is performing Kalman filtering at the output of the pose CNN, e.g., by assuming a constant speed that may be set as the averaged speed from training sequences. As shown at row 6 in Table 2 (denoted "Pose CNN w KF," the results improve slightly for translation, but worsen for rotation, which means that the filter oversmoothed the sequence. Finally, when combining pose CNN and RNN, the best pose estimation both for t and r is achieved.

ments that use no pose prior. However, the network in this embodiment is about 10× faster, and runs in 90ms. At 3rd row, the ground truth pose rendered label map is used as segment CNN prior to obtain an upper-bound for the segmentation performance. In this embodiment, the rendered label map aligns perfectly with the image, thus, yielding significantly better results without misclassifying most of the static background. The 4th and 5th row show the results trained with rendered label map from the pose CNN and the pose CNN-RNN, respectively. The results improve slightly for the pose CNN compared to the segment CNN. This is because the offset may still significant for some finer structures. Notice that for a fair comparison, after convergence of the segment CNN, training the network may continue for another 100 epochs in order to avoid the effects of longer training. However, when using the pose after the RNN, better alignment may be achieved, and the segment accuracy may improve significantly; especially, for finer structured regions, such as light poles, as visualized in FIG. 5, which demonstrates the effectiveness of various embodiments.

Figure 5:
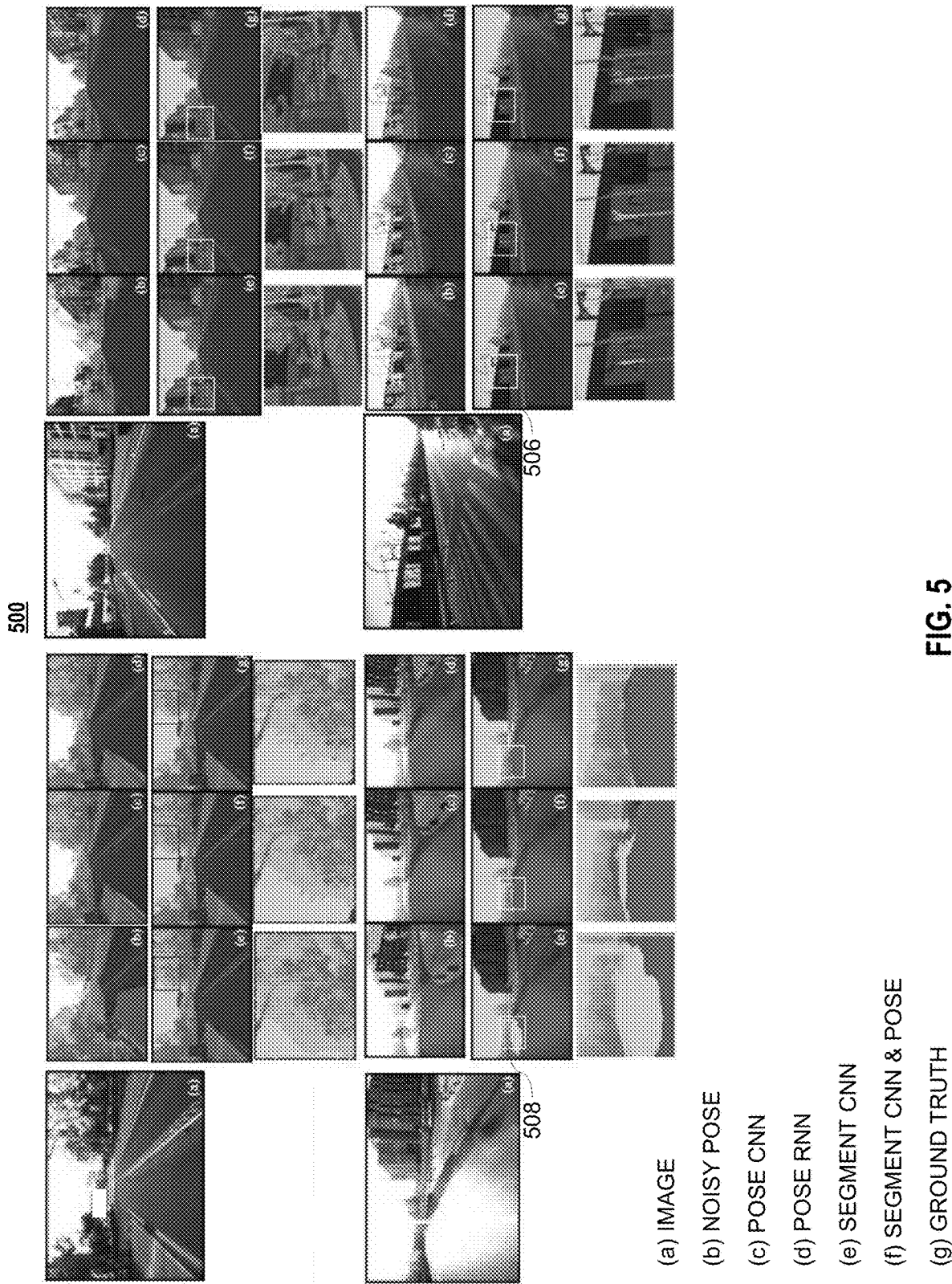
FIG. 5 illustrates exemplary results produced by intermediate stages of an embodiment of the system shown in FIG. 1.

FIG. 5 illustrates exemplary results produced by intermediate stages of an embodiment of the system shown in FIG. 1. Label maps for image (a) in FIG. 5 comprise noisy pose (b); pose CNN (c); pose RNN (d); segment CNN (e); segment CNN & pose (f); and Ground Truth (g). Certain

TABLE 3

| Method | mIOU | mAcc | Pix. Acc | sky | car-lane | ped-lane | bike-lane |
|---|---|---|---|---|---|---|---|
| ResNet38 | 64.66 | 71.92 | 95.87 | 94 | 98.5 | 82.9 | 87.2 |
| SegCNN w/o Pose | 68.35 | 77.09 | 95.61 | 94 | 98.6 | 83.8 | 89.5 |
| SegCNN w pose GT | 79.37 | 86.8 | 97.1 | 96 | 99.4 | 92.5 | 93.9 |
| SegCNN w Pose CNN | 68.6 ± 0.12 | 77.95 ± 0.16 | 95.67 ± 0.01 | 95 | 98.7 | 84.3 | 89.3 |
| SegCNN Final | 69.93 ± 0.08 | 79.36 ± 0.08 | 95.98 ± 0.004 | 95 | 98.8 | 85.3 | 90.2 |

| Method | curb | t-cone | t-stack | t-fence | light-pole | t-light | tele-pole |
|---|---|---|---|---|---|---|---|
| ResNet38 | 61.8 | 46.1 | 41.7 | 82 | 37.5 | 26.7 | 45.9 |
| SegCNN w/o Pose | 69.3 | 47.5 | 52.9 | 83.9 | 52.2 | 43.5 | 46.3 |
| SegCNN w pose GT | 81.4 | 68.8 | 71.4 | 90.8 | 71.7 | 64.2 | 69.1 |
| SegCNN w Pose CNN | 69 | 46.8 | 52.9 | 84.9 | 53.7 | 39.5 | 48.8 |
| SegCNN Final | 71.9 | 45.7 | 57 | 58.9 | 58.5 | 41.8 | 51 |

| Method | t-sign | bill-board | temp-build | building | sec.-stand | plants | object |
|---|---|---|---|---|---|---|---|
| ResNet38 | 49.5 | 60 | 85.1 | 67.3 | 38 | 89.2 | 66.3 |
| SegCNN w/o Pose | 52.9 | 66.9 | 87 | 69.2 | 40 | 88.6 | 63.8 |
| SegCNN w pose GT | 72.2 | 83.7 | 91.3 | 76.2 | 58.9 | 91.6 | 56.7 |
| SegCNN w Pose CNN | 50.4 | 67.9 | 87.5 | 69.9 | 42.8 | 88.5 | 60.9 |
| SegCNN Final | 52.2 | 69.4 | 88.5 | 70.9 | 48 | 89.3 | 59.5 |

Segment Evaluation. Table 3 shows scene parsing results by quantitatively comparing accuracies for various segment network configurations according to embodiments of the present disclosure. Symbol "t" in Table 3 denotes "traffic," and "±" indicates the confidence region for 10 simulations. As discussed further below with reference to FIG. 5, the results demonstrate excellent parsing of detailed structures and scene layouts.

In embodiments, a known parsing network may be used on the CityScapes dataset, i.e., ResNet38, and trained with a novel dataset. The network may utilize pre-trained parameters from the CityScapes dataset, and run with a 1.03s per-frame with a predetermined resolution. As shown in the 1st row in Table 3, the network achieves reasonable accuracy compared to a segment CNN (2nd row) according to embodiimproved regions in FIG. 5 are indicated by a box 506 and shown in expanded view 508.

As shown in FIG. 5, noisy pose (b) is progressively rectified by pose CNN (c) and pose RNN (d) for a given camera view. Additionally, at (e) and (f), the segment results are compared without and with camera pose, respectively. As indicated by the boxed regions, the segment results with pose rendered label maps provide enhanced accuracy in terms of capturing region details at the boundary, aid in discovering rare classes, and maintaining correct scene layout. All these properties may be important for navigation, e.g., to identify traffic signs and tele-poles that, otherwise, may be visually hard to detect.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, tablet, personal digital assistant (PDA), smart phone, smart watch, smart package, server (e.g., blade server or rack server), a network storage device, camera, or any other suitable device and may vary in size, shape, performance, functionality, and price. Such a computing system may be placed in a vehicle and coupled to GPS and camera inputs. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
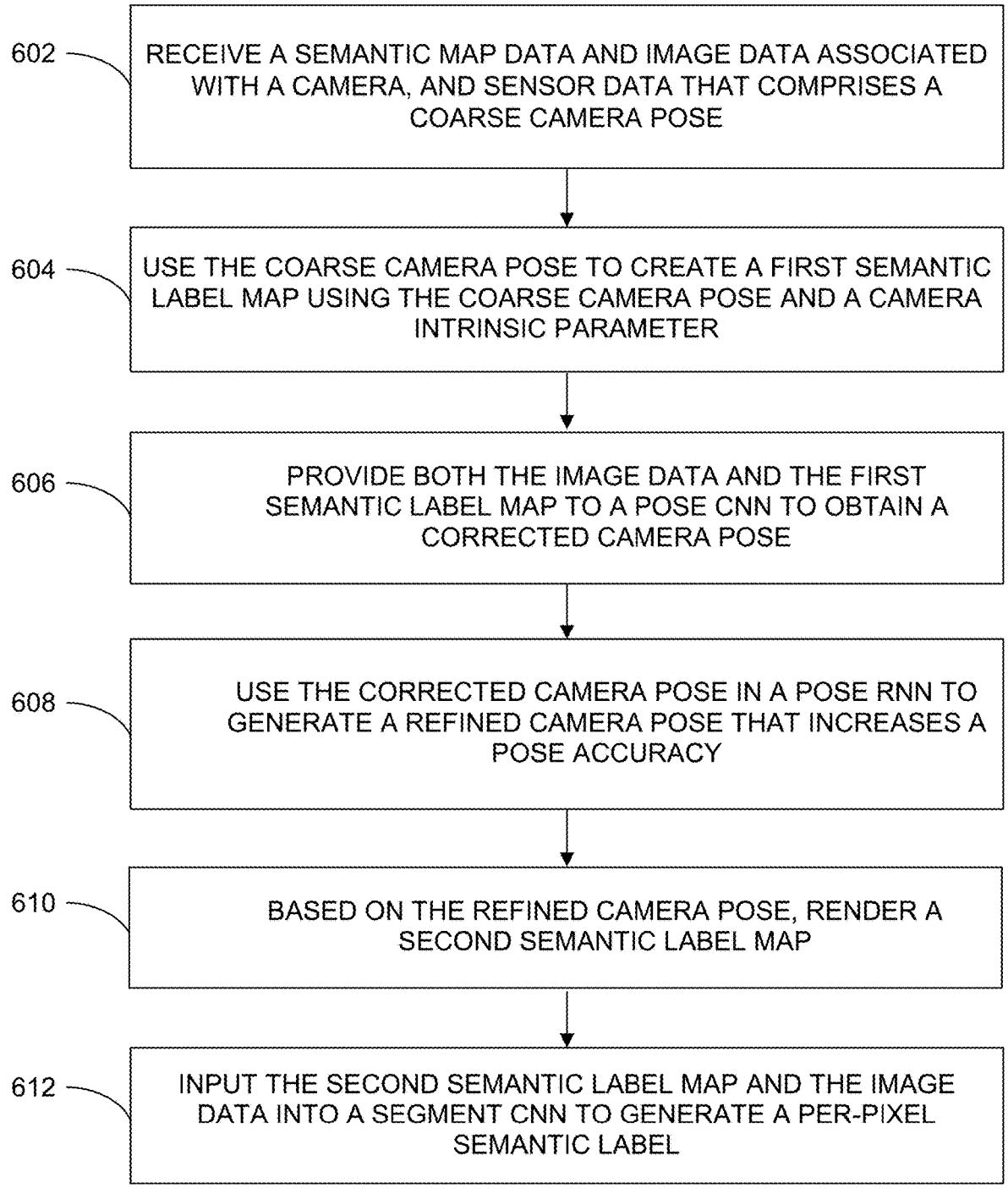
FIG. 6 is a flowchart of an illustrative process for training and/or using a model to perform joint scene parsing and camera pose estimation according to embodiments of the present disclosure.

FIG. 6 is a flowchart of an illustrative process for training and/or using a model to perform joint scene parsing and camera pose estimation according to embodiments of the present disclosure. Process 600 begins when semantic map data (e.g., a pre-built or pre-recorded 3D semantic map), image data associated with a camera that may have a camera intrinsic parameter, and sensor data that generates a coarse camera pose are received (602). In embodiments, the sensor data may be received from a motion sensor, such as a GPS or an IMU. Using the coarse camera pose and a camera intrinsic parameter, a first semantic label map may be created (604). In embodiments, both the image data and the first semantic label map may be provided (606) to a pose network, such as a pose CNN, to obtain a corrected camera pose. In embodiments, the image data is input (612) into a segment network to generate a 2D parsing that is associated with the inputted image and that may comprise a per-pixel semantic label.

In embodiments, the corrected camera pose may be used (608) in a second pose network, such as a pose RNN, to generate a refined camera pose to increase a pose accuracy. In embodiments, the pose network may calculate a relative rotation and translation. In embodiments, the corrected camera pose may be used to generate temporal correlations. In embodiments, based on the refined camera pose, a second semantic label map may be rendered and input to the segment network. In embodiments, the second semantic label map may be transformed to a score map, e.g., through a one-hot operation.

In embodiments, in a training phase, a loss that may comprise a weight factor, e.g., a weight factor that depends on a semantic class, may be used.

Figure 7:
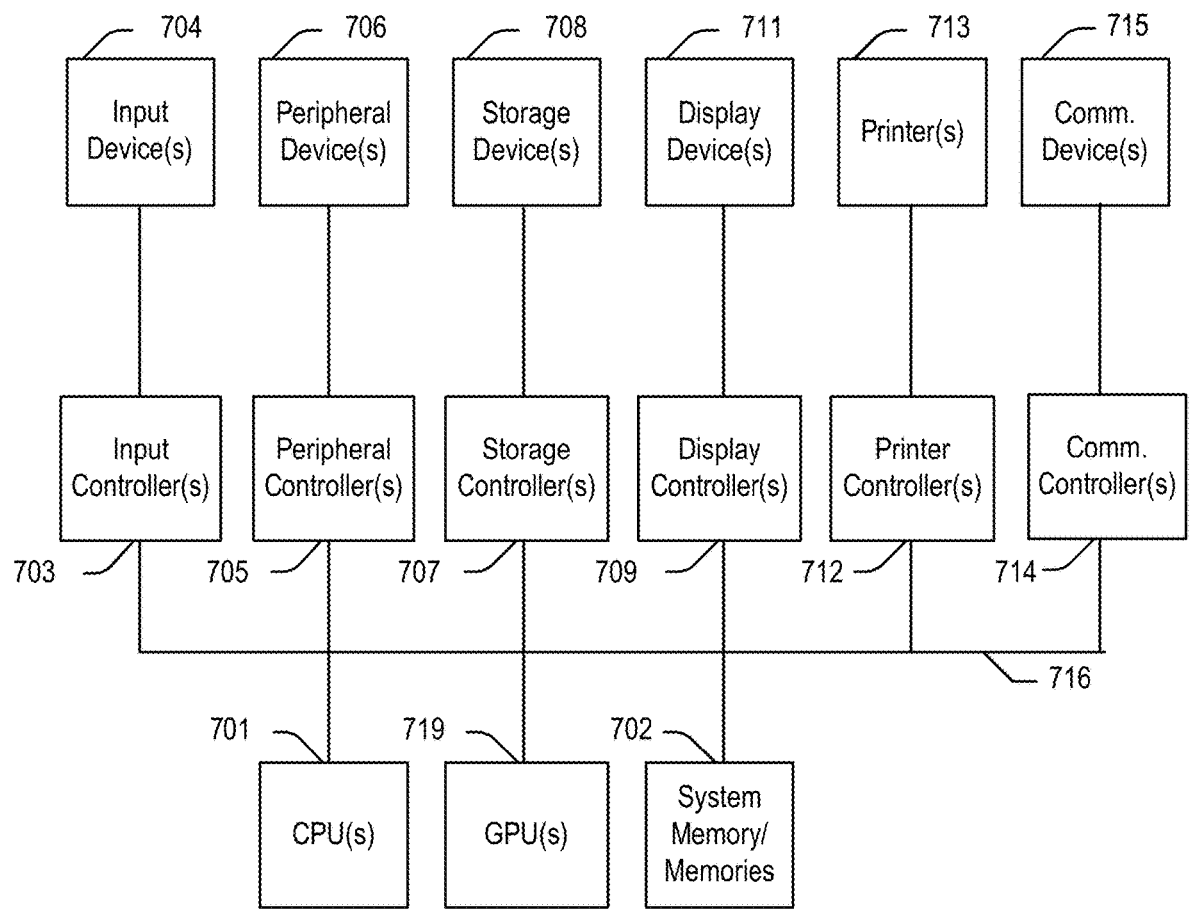
FIG. 7 depicts a simplified block diagram of a computing device/information handling system, in accordance with embodiments of the present disclosure.

FIG. 7 depicts a simplified block diagram of a computing device/information handling system (or computing system) according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more GPU 719 and/or a floating-point coprocessor for mathematical computations. System 700 may also include a system memory 702, which may be in the form of random-access memory (RAM), read-only memory (ROM), or both.

A number of controllers and peripheral may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present application. Storage device(s) 708 may also be used to store processed data or data to be processed in accordance with the application. The system 700 may also include a display controller 709 for providing an interface to a display device 711, which may be a cathode ray tube (CRT), a thin film transistor (TFT) display, organic light-emitting diode, electroluminescent panel, plasma panel, or other type of display. The computing system 700 may also include one or more peripheral controllers or interfaces 705 for one or more peripheral devices 706. Examples of peripheral devices may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the application may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present application may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present application may further relate to computer products with a non-transitory, tangible computer-readable medium that have computer code thereon for performing various computer-implemented operations. The media and computer code may be those specially designed and constructed for the purposes of the present application, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present application may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present application. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for using a network to perform joint scene parsing and camera pose estimation, the method comprising:
   receiving semantic map data, image data associated with a camera, and sensor data that comprises a coarse camera pose;
   creating a first semantic label map by using the coarse camera pose and a camera intrinsic parameter;
   providing both the image data and the first semantic label map to a first pose network to obtain a corrected camera pose; and
   inputting the image data into a segment network to generate a two-dimensional parsing associated with the inputted image data.

2. The method of claim 1, wherein the sensor data is provided by a motion sensor.

3. The method of claim 1, further comprising using the corrected camera pose in a second pose network to generate a refined camera pose to increase a pose accuracy.

4. The method of claim 3, wherein the first pose network and the segment network are convolutional neural networks, and the second pose network is a recurrent neural network.

5. The method of claim 3, further comprising, based on the refined camera pose, rendering a second semantic label map that is input to the segment network.

6. The method of claim 5, wherein the second semantic label map is embedded into the segment network as a segmentation context.

7. The method of claim 5, further comprising transforming the second semantic label map to a score map through a one-hot operation.

8. The method of claim 1, wherein the two-dimensional parsing comprises a per-pixel semantic label.

9. The method of claim 1, wherein the first pose network calculates a relative rotation and translation, and wherein the corrected camera pose is used to generate temporal correlations.

10. A system for joint scene parsing and camera pose estimation, the system comprising:
    a camera that has an intrinsic parameter and generates image data;
    a sensor that generates sensor data comprising a coarse camera pose;
    a processor comprising instructions that when executed create a first semantic label map based on semantic map data, the image data, and the sensor data;
    a first pose network that in response to receiving the image data and the first semantic label map generates a corrected camera pose; and
    a segment network that, based on the image data, generates a two-dimensional parsing that is associated with the image data.

11. The system of claim 10, wherein the sensor data is provided by a motion sensor.

12. The system of claim 10, wherein the sensor data comprises a location estimate.

13. The system of claim 10, further comprising a second pose network that, based on the corrected camera pose, generates a refined camera pose to increase a pose accuracy by rendering a second semantic label map that is input to the segment network.

14. The system of claim 13, wherein the second semantic label map is two-dimensional and embedded into the segment network as a segmentation context.

15. The system of claim 10, wherein the semantic map data comprises a point of a three-dimensional point cloud, the point being enlarged to a two-dimensional square whose size is determined by a semantic class associated with the three-dimensional point cloud.

16. A method for training a network to perform joint scene parsing and camera pose estimation, the method comprising:
    receiving semantic map data, image data associated with a camera, and sensor data that comprises a coarse camera pose;

creating a semantic label map by using the coarse camera pose and a camera intrinsic parameter;

providing both the image data and the semantic label map to a first pose network to obtain a corrected camera pose;

inputting the image data into a segment network to generate a two-dimensional parsing associated with the inputted image; and using a loss that comprises a weight factor that depends on a semantic class.

17. The method of claim 16, wherein the first pose network and the segment network are convolutional neural networks, further comprising a second pose network that is a recurrent neural network.

18. The method of claim 16, wherein the semantic map data comprises a point of a three-dimensional point cloud, the point being enlarged to a two-dimensional square whose size is determined by a semantic class associated with the three-dimensional point cloud.

19. The method of claim 18, wherein the size of the two-dimensional square is proportional to an average distance between the camera and the semantic class.

20. The method of claim 16, further comprising removing data associated with moving objects from the semantic map data by at least one of repeatedly scanning a road segment, aligning and fusing point clouds in the semantic map data, and removing, from point clouds in the semantic map data, points that have a relatively lower temporal consistency.

* * * * *